(12) United States Patent
Kuppenheimer et al.

(10) Patent No.: US 7,518,804 B2
(45) Date of Patent: Apr. 14, 2009

(54) SINGLET TELESCOPES WITH CONTROLLABLE GHOSTS FOR LASER BEAM FORMING

(75) Inventors: John D. Kuppenheimer, Corona Del Mar, CA (US); Robert B. Kuppenheimer, legal representative, Corona Del Mar, CA (US); William F. Wing, Ashland, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/553,822

(22) PCT Filed: Feb. 26, 2004

(86) PCT No.: PCT/US2004/005812

§ 371 (c)(1),
(2), (4) Date: Dec. 20, 2006

(87) PCT Pub. No.: WO2004/097465

PCT Pub. Date: Nov. 11, 2004

(65) Prior Publication Data

US 2007/0177260 A1    Aug. 2, 2007

Related U.S. Application Data

(60) Provisional application No. 60/465,166, filed on Apr. 24, 2003.

(51) Int. Cl.
*G02B 3/00* (2006.01)
*G02B 27/30* (2006.01)

(52) U.S. Cl. ............................... 359/642; 359/641
(58) Field of Classification Search ............. 359/641, 359/708, 710, 718, 719, 642
See application file for complete search history.

(56) References Cited

U.S. PATENT DOCUMENTS

| | | | |
|---|---|---|---|
| 5,181,224 A * | 1/1993 | Snyder ................. | 372/101 |
| 5,184,245 A * | 2/1993 | Murakami et al. .... | 359/196 |
| 6,075,650 A * | 6/2000 | Morris et al. ......... | 359/641 |
| 6,195,208 B1 * | 2/2001 | Ngoi et al. ............ | 359/641 |
| 6,819,491 B2 * | 11/2004 | Takahashi et al. .... | 359/566 |

* cited by examiner

*Primary Examiner*—Scott J Sugarman
(74) *Attorney, Agent, or Firm*—Daniel J. Long

(57) ABSTRACT

A singlet telescope is provided for reshaping the laser beam to a larger or smaller diameter while maintaining the inherent quality of the beam. Applications for the singlet telescope include intercavity expansion to accommodate the damage thresh-old of various components, expansion of beams to match the size of different wavelengths for final collimation, and shrinking of beams to provide high irradiance for nonlinear processes such as optical parametric oscillation and frequency doubling, with the above applications usually requiring low power magnification or demagnification. Problems involving the utilization of these telescopes over wide temperature ranges and ghost reflections in which a light is reflected back to a pumping laser are minimized with the singlet construction, with the ghost reflections potentially creating damage of components including self-damage or breakdown of air, as well as damage to a Q-switched resonator which causes pre-lasing.

7 Claims, 12 Drawing Sheets

SINGLET TELESCOPES WITH CONTROLLABLE GHOSTS FOR LASER BEAM FORMING

CROSS REFERENCED RELATED APPLICATION

This application claims rights under 35 USC § 119(e) from U.S. Application Ser. No. 60/465,166 filed: 24 Apr. 2003, the contents of which are incorporated herein by reference.

FIELD OF THE INVENTION

This invention relates to telescopes for laser beam forming and more particularly to a singlet telescope which minimizes ghosts and eliminates the problems associated with multiple-element telescopes.

BACKGROUND OF THE INVENTION

Multiple-element telescopes have been utilized in the past to reshape the output of pump lasers so that the pump laser output can be more efficiently coupled, for instance, to an optical parametric oscillator (OPO). The purpose of the telescope is to be able to magnify or demagnify the pump laser output so as to duplicate the waist of the beam which exists at the output mirror of the pumping laser and position it at a precise location within the nonlinear crystal utilized in the optical parametric oscillator. As a result, for a given diameter waist associated with an output beam, and with the waist existing at the planner output mirror of the pumping laser, it is important to be able to either magnify or demagnify the waist so as to provide a predetermined waist within the body of the nonlinear crystal.

In general, for optical parametric oscillators, it is important to be able to demagnify the beam produced by the pump laser so that the telescope is in essence a demagnifying telescope. Typically, for a 1.06 micron pump laser, in certain applications it is important to have a 0.5× telescope so that if the waist diameter, for instance, at the pump laser is 0.5 millimeters, then the waist diameter within the optical parametric oscillator crystal is to be 0.25 millimeters. To do this, the characteristics of the pumping laser output within the optical parametric oscillator must be carefully controlled.

More specifically, it is important to control aberrations caused by the telescope and most importantly third-order aberrations so as to limit the waist diameter. Typically, third order aberrations cause waists which are larger than desired and therefore materially affect the efficiency of the optical parametric oscillator. Oftentimes aberrations cause a 10% decrease in efficiency in the optical parametric oscillator or sometime as much as a 50% decrease. This is unacceptable and multi-element telescopes have to be carefully designed to minimize aberrations.

Moreover, the inability to control the waist within the optical parametric oscillator crystal can result in a waist which is considerably smaller than that for which the system is designed. When such third-order aberrations occur, pumping with a waist too small can in fact drill a hole completely through the nonlinear crystal in the OPO. Most usually for reduced-diameter waists, the concentration of energy within the nonlinear crystal can cause the nonlinear crystal to crack, thus causing the laser to malfunction or die.

There is also a considerable ghost problem when utilizing multi-element telescopes. The ghost occurs by back reflection into the laser cavity of the pumping laser, which typically produces nanosecond Q-switched pulses. Note that the retro-reflective ghost can damage the Q-switch or can cause pre-lasing in the pump laser.

Antireflective coatings are utilized in part to limit the amount of retro-reflective ghost that occurs. However, anti-reflective coatings can only reduce ghosts so far. As will be appreciated, the larger the number of lenses there are, the worse are the ghost retro-reflections. This is because back reflection into the laser cavity of the pumping laser occurs from the reflective surfaces the lenses used in the multi-element set. For instance, in a four-element telescope, there are eight reflective surfaces which must be taking into account. Some multi-element telescopes utilize six or seven lenses, resulting in 12 to 14 reflective surfaces.

Antireflective coatings on these surfaces are designated, for instance, to be 99.5% transmissive and 0.5% reflective. However, even with back reflection limited to 0.5%, deleterious ghosts occur. The problem of eliminating ghosts is complicated with multi-element sets due to the fact that while ghosts are less important when a convex lens surface points back to the pump laser which results in a diverging back reflection, lens surfaces which are concave when pointed at the pumping laser result in hot spots of back-reflected energy.

Of course, the utilization of multiple lenses in a telescope requires very accurate calibration procedures and ones which take into account the types of materials utilized in the lenses, their temperature coefficients of expansion, their refractive indices, and indeed the stability of the optical bench on which the lenses are mounted. Note that with temperature changes, the physical dimensions of the optical bench change, thus causing alignment errors. This is compounded in proportion to the number of optical elements mounted to the optical bench.

Thus, increasing the complexity of the telescope increases the retro-reflected ghosts that can cause pre-lasing as well as presenting alignment complexities that are hard to compensate for.

Moreover, for a typical three-element telescope, the cost may be on the order of $2,500.00, which is indeed a large cost factor in the overall cost of the laser system. When optical parametric oscillators are utilized for tunable mid-IR radiation generation for use, for instance, in countermeasures, laser target designators, or atmospheric pollution measurements, the cost of the telescope is sometimes cost-prohibitive.

Additionally, if third-order aberrations are caused by the multi-element set, then as mentioned before efficiencies of the overall laser system may be reduced by as much as 50%, especially when the waist provided within the nonlinear crystal is larger than desired.

Thus, there are a wide variety of problems associated with multi-element telescopes utilized to reshape the output beam of a pumping laser, including the lack of ability to control the waist in the optical parametric oscillator, the inability to control retro-reflecting ghosts, the inability to properly calibrate the multi-element set of lenses, and indeed the overall cost of the multi-element set.

SUMMARY OF THE INVENTION

In order to eliminate the problems associated with multi-element telescopes, a singlet telescope is utilized in which there is only one lens. The lens is a monolithic element with two spaced-apart surfaces at either end, with the surfaces being radiused in the same direction. As such, the telescope has only two reflective surfaces from which retro-reflective ghosts could be produced. The lens is designed to be used at a particular wavelength. For demagnification, both of the above-mentioned surfaces are convex in the direction of the pumping laser. For magnification the singlet lens is simply turned around. Note that in the design of the singlet telescope, the length is usually specified, with the angular power being the variable.

As will be seen, the desired magnification determines the input radius of curvature of the input lens in accordance with:

$$R_1 = \frac{Z(n-1)}{n(1-m)} \quad \text{Equation 1}$$

where $R_1$ is the radius of curvature of the input surface, Z refers to the length of the element, n is the index of refraction of the lens medium and m is the angular magnification. Note that for practical applications one fixes the length of the scope and varies the angular power. It is noted that with a choice of material, the input radius of curvature and the magnification completely determines the design of the singlet telescope. Note also that the index of refraction is a function of wavelength such that, in calculating the radius of the input curvature, one takes into account the wavelength at which the singlet telescope is to operate.

By providing a specially designed singlet telescope configured for a particular wavelength, the singlet telescope eliminates the problems of multi-element telescopes. First and foremost, the number of lenses is reduced to one, such that there are only two reflective surfaces which contribute to retro-reflective ghosts. When utilizing the singlet lens for demagnification in which the waist of the beam is reduced, it is noted that each of the two surfaces is convex towards the pump beam. This means that back reflection is diverging and has less effect on the Q-switch used by the pump laser and prevents pre-lasing. If on the other hand one wishes to expand the pump beam, then the lens is turned around and one has only two surfaces which are focusing back reflections. Note that these surfaces are concave. One can arrange the singlet lens so that the back reflections are focused quite close to the lens so that radiation returned to the laser's Q-switch is minimal due to divergence of the retro-reflective ghosts after the focusing caused by the concave surfaces. Thus, if the combined focal point of the singlet lens is close to the lens, the focused retro-reflected energy will be diverging after the focal point towards the pump laser and the retro-reflected light impinging on the Q-switch will be diverging and less of problem.

Note that for demagnification there are virtually no retro-reflective ghosts, whereas for the magnification case the hot spots are determined by the center of radius of the lens, with the center of radius being a combination of the radii of the first and second surfaces. Thus, the focal length of the lens for retro-reflection is a combination of the focal lengths of the two surfaces.

Importantly, it has been found that for magnification or demagnification under 2× the third-order aberrations are insignificant and as a result one can use a singlet telescope to focus the energy from a laser pump source into a nonlinear crystal of an optical parametric oscillator without affecting efficiency. Moreover, the subject lens can be used with Class 3 lasers and can be used in any laser device in which an optical parametric oscillator is being pumped. Further, one usually wants a one-to-one magnification or slightly less. Therefore, one wants a slightly smaller waist produced in the optical parametric oscillator than is produced at the output mirror of the pump laser.

Moreover, since one does not utilize multiple elements in the telescope, different optical materials are not used and one does not have complicated thermal considerations.

In general, the subject singlet telescope is used to control the natural output divergence from a laser. If one wants less divergence, one has to have a magnifying telescope. This makes the beam larger or bigger so that one has less divergence. If one needs more divergence, then one needs to make the beam smaller to get more divergence.

From a calibration point of view, the singlet lens requires the least calibration and is the least expensive approach for reshaping a laser beam. Moreover, the singlet lens is an order of magnitude less in cost than most multi-element telescopes.

Since it has been found that third-order aberrations are insignificant with the singlet telescope at low magnification, one can maintain the quality of the waist of the pumping laser output beam in the optical parametric oscillator and can carefully control the size of the waist as well as preserving the original characteristics of the beam. The result is that the efficiency of the optical parametric oscillator or indeed the whole laser system can be maximized, thus to eliminate 50% reductions in efficiency due to improperly-aligned lenses or aberrations. Not only will efficiencies be maintained when using the subject lens, but the problem having to do with a too-small spot size that causes fractures of the nonlinear crystal is eliminated. Thus, pump lasers operating in the millijoule range with ultrashort nanosecond pulses and many megawatts of power per square centimeter can be safely utilized without fear of damage to the nonlinear crystal of the pump.

As will be appreciated, the subject singlet telescope faithfully reproduces the pump laser beam in the optical parametric oscillator with a controllable waist. Moreover, retro-reflections causing ghosts are either completely eliminated or are readily controllable. Importantly, one eliminates the four-, five- and six-element telescopes with the eight, ten or twelve reflective surfaces involved.

In practice, knowing the length of the lens which will fit into the particular laser system, one configures the magnification so as to be able to calculate the radius of curvature of the first surface. The subject singlet telescope therefore has application in military systems such as laser target designators and IR countermeasure systems in which optical parametric oscillators are utilized to provide mid-IR wavelengths. Moreover, with tunable optical parametric oscillators, one can readily probe the atmosphere for pollutants or toxins with a reasonably-sized, cost effective laser system.

While the subject system has been described in terms of the reshaping of pump laser beams, the subject singlet telescope has application in a wide variety of other laser applications. Its simplicity, temperature stability, ease of calibration, and cost effective design offers advantages in other laser systems and those in which a pumping laser is utilized to pump an optical parametric oscillator.

In summary, a singlet telescope is provided for reshaping the laser beam to a larger or smaller diameter while maintaining the inherent quality of the beam. Applications for the singlet telescope include intercavity expansion to accommodate the damage threshold of various components, expansion of beams to match the size of different wavelengths for final collimation, and shrinking of beams to provide high irradiance for nonlinear processes such as optical parametric oscillation and frequency doubling, with the above applications usually requiring low power magnification or demagnification. Problems involving the utilization of these telescopes over wide temperature ranges and ghost reflections in which a light is reflected back to a pumping laser are minimized with the singlet construction, with the ghost reflections potentially creating damage of components including self-damage or breakdown of air, as well as damage to a Q-switched resonator which causes pre-lasing.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
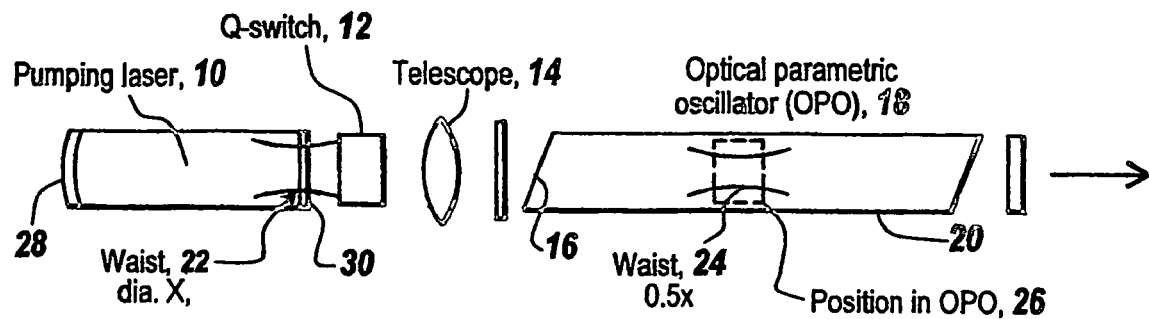
FIG. 1 is a diagrammatic illustration of the utilization of a pumping laser to pump an optical parametric oscillator in which the output of the pumping laser has a waist which is focused by a telescope into the interior of the nonlinear crystal utilized in the optical parametric oscillator so as to provide a waist diameter of a predetermined size and position within the optical parametric oscillator.

Referring now to FIG. 1, as is typically the case, a pumping laser 10 having a Q-switch 12 has its output focused by a telescope 14 into an end 16 of an optical parametric oscillator 18 having a nonlinear crystal 20.

The output of pumping laser 10 is characterized by a waist 22 having a diameter X. It is the purpose of telescope 14 to reshape the output of the pumping laser and to project waist 22 as waist 24 at a specific location 26 within nonlinear crystal 20.

Typically, telescope 14 is a demagnifying telescope or a so-called downscope. The result is that the waist diameter of the beam in crystal 20 is 0.5×, and is positioned at area 26 within the crystal.

It is important that the output of the pumping laser be faithfully reproduced in the nonlinear crystal, with pumping laser 10 typically having a concave mirror 28 and an output mirror 30, which is planar and partially reflective. It is the desired result that the waist produced at output mirror 30 be faithfully reproduced in crystal 20.

As mentioned hereinbefore, the diameter of waist 24 is critical to the efficiency of the overall lasing system, as is the position of the waist within crystal 20.

Figure 2:
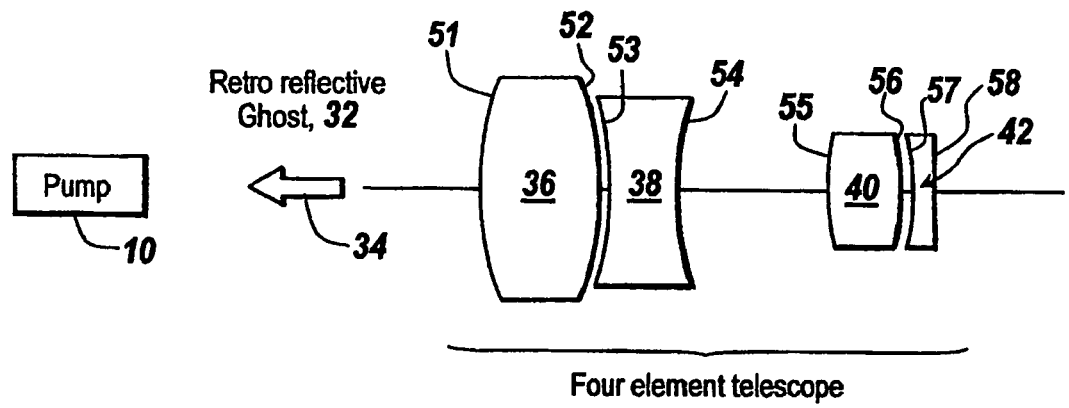
FIG. 2 is a diagrammatic illustration of a prior art multi-element telescope utilized to focus the output of the pumping laser of FIG. 1 into the optical parametric oscillator thereof, showing eight reflective surfaces on the four elements illustrated, with each of the reflective surfaces adding to a ghost which is propagated back towards the pumping laser.

It is also important, as illustrated in FIG. 2, that retro-reflective ghosts 32, directed backwardly as illustrated by arrow 34 into pump laser 10, be minimized to the greatest extent possible so as to prevent damage to the Q-switch and to prevent pre-lasing.

As can be seen, the four-element telescope of FIG. 2 includes lenses 36, 38, 40 and 42, with each of the lenses having two radiused surfaces, here labeled $S_1$ through $S_8$.

What is important to realize is that with the multi-element telescopes such as the one illustrated in FIG. 2, there are multiple reflective surfaces which contribute to the retro-reflective ghost 32 injected back into laser pump 10. As mentioned hereinbefore, the amount of retro-reflective ghosts is proportional to the number of reflecting surfaces in the telescope and therefore to the number of telescope lenses.

Figure 3:
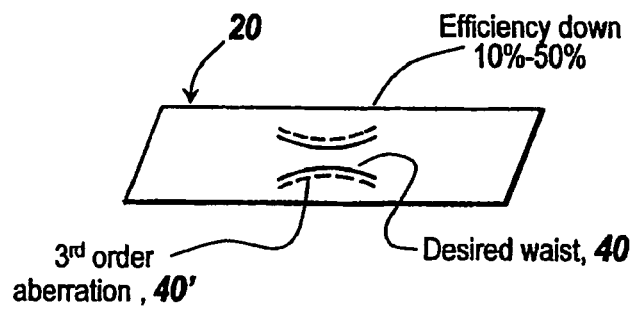
FIG. 3 is a diagrammatic illustration of the effect of third-order aberrations on the waist of the beam projected into the end of a nonlinear crystal, showing the desired waist diameter and the increase in the waist diameter due to the third-order aberration, thus to affect overall efficiency by as much as 50%.

Referring to FIG. 3, in any telescope used to focus the energy of a pumping laser into a nonlinear crystal, it is important that the waist of the crystal have the desired diameter, here shown at 40. If inherent in the telescope there are third-order aberrations, then waist 40 will increase in size as illustrated by third-order aberration 40'. What this means is that there is less radiance concentrated within the nonlinear crystal, which can reduce the efficiency of the optical parametric oscillator utilizing this crystal. It can be shown that, depending on the amount of aberration, the efficiency of the optical parametric oscillator can be decreased by as much as 50% due to aberrations caused by the telescope.

Referring back to FIG. 2, it will also be appreciated that each of the lenses 36-42 may be made of a different material, each having a different but controllable thermal coefficient of expansion. How these lenses interact with temperature change, especially when mounted in an optical bench, is a cause of much concern in the alignment process. The alignment process complications are directly proportional to the number of elements in the telescope. Thus, it is of paramount importance to reduce the number of elements in the telescope, both to reduce aberrations and to reduce retro-reflective ghosts.

Figure 4:
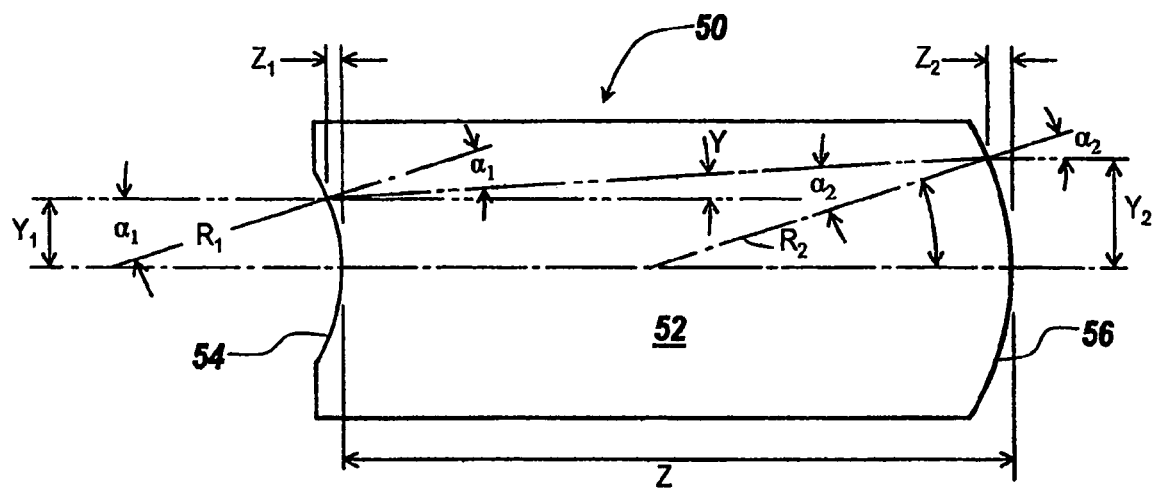
FIG. 4 is a diagrammatic illustration of the subject singlet telescope, including a monolithic lens having a predetermined length and an input radius $r_1$ which, with the index of refraction of the material of the lens, and the wavelength at which the lens is to be operated, defines the singlet lens structure.

Referring now to FIG. 4, a singlet telescope 50 includes a lens 52 of a predetermined material. The lens has an input or illuminated radiused surface 54 having a radius $R_1$. The lens has a length $Z_0$ as illustrated and has an exit or output radius and surface 56. Note that in one embodiment the input and the output radii are identical.

It will be shown that it is possible to completely characterize the single specifying its length, its index of refraction and the magnification desired. In so doing it has been found that such a lens meets and exceeds the anti-aberration requirement especially for the application in which a pumping laser is to pump an optical parametric oscillator. In such cases it has been found that magnifications under 2× have thkrd-order aberrations which are insignificant. What is now presented is a explanation of the phenomena of the singlet telescope.

1.0 Introduction

Many applications involving lasers require reshaping the laser beam to smaller diameter while maintaining the inherent etendue of the beam. These such things as intercavity expansion to accommodate the damage threshold of components, expansion of beams to match the size of different wavelengths collimation, and shrinking of beams to provide high irradiance for nonlinear processes such as optical parametric oscillation (OPO) and frequency doubling applications usually require low power (1.2-2.5×) magnification. The associated with the design of these telescopes involves the use of the scopes over temperature and the ghost reflections (ghosts) which occur when light reflects from anti-reflection coated surfaces. These reflections create two types of problems is the damage of components (including self damage) or breakdown of air. The second is reflection back into an unprotected Q-switched resonator which can cause pre-lasing.

The traditional method of handling such problems is to design telescopes with two or more elements, using a selection of materials to accommodate all the above problems. It turns out that many, and sometimes all of the problems can be solved using a single optical element. Section 2 of this paper gives the theory associated design. Section 3 and 4 derive the useful temperature and wavelength ranges over which the scope will work. Section 5 discusses the problem of nonlinear absorption. Section 6 gives the explicit form for the harmful ghosts and their relationship to the scope magnification. Finally section 7 summarizes the results.

2.0 Theory

The derivation of the properties of the telescope is made easy by the use of the usual abcd matrix operator.

$$\begin{bmatrix} \ddot{\alpha}' \\ y' \end{bmatrix} = \begin{bmatrix} b & -a \\ d & c \end{bmatrix} \begin{bmatrix} \ddot{\alpha} \\ y \end{bmatrix} \quad (2\text{-}1)$$

$\ddot{\alpha}$ is the augmented angle, $\alpha n$, where n is the index of refraction of the medium in which the ray finds itself and y is the reduced height $\ddot{y}/n$. Any system which is telescopic has zero power and thus:

$a=0$

This implies that the angular magnification is:

$$\frac{\ddot{\alpha}'}{\ddot{\alpha}} = b = m_\alpha \quad (2\text{-}2)$$

Since the determinate of the operator is always 1, we have:

$bc=1$ and:

$c=1/m_\alpha.$

Now with reference to FIG. 4, $r_1$ is the input radius, $r_2$ is the output radius, and z is the axial thickness. Combining the matrices for the surface powers and the thickness gives:

$$\begin{bmatrix} 1 + \frac{z(n-1)}{nr_2} & (1-n)\left[\frac{1}{r_1} - \frac{1}{r_2} + \frac{(n-1)z}{nr_1r_2}\right] \\ \frac{z}{n} & 1 + \frac{z(1-n)}{nr_1} \end{bmatrix} \quad (2\text{-}3)$$

The angular magnification is:

$$m_\alpha = b = 1 + \frac{z(n-1)}{nr_1} \quad (2\text{-}4)$$

The power of the system (which is 0) is given by $-a$. Thus $$a = (n-1)\left[\frac{1}{r_1} - \frac{1}{r_2} + _1\frac{(n-1)z}{nr_1r_2}\right] = 0 \quad (2\text{-}5)$$

$$z = \frac{n(r_1 - r_2)}{(n-1)} \quad (2\text{-}6)$$

and $$m_\alpha = \frac{r_1}{r_2}. \quad (2\text{-}7)$$

The linear magnification for rays emanating from infinity is:

$y' = d\ddot{\alpha} + cy$ $\ddot{\alpha}=0.$

Therefore the linear magnification is:

$$c = 1/b = 1/m_\alpha = \frac{r_2}{r_1} = \frac{y'}{y} = m. \quad (2\text{-}8)$$

$$z = \frac{nr_1(1-m)}{(n-1)} \quad (2\text{-}9)$$

Thus the choice of a material, an input radius of curvature, and a magnification completely determines the design of the telescope. The paraxial approximation is quite adequate for normal manufacturing tolerances, but slightly better theoretical performance can be had by choosing the length of the telescope to correct the ray aberrations at a different height.

To see this, note that the ray aberrations are proportional to the cube of the ray height (derived below). Thus:

$$\Delta\theta_m = GY_m^3$$

Where:

$\Delta\theta_m$=the angular error of the marginal ray
$Y_m$=the output height of the marginal ray
G=some proportionality constant And $$\Delta\theta_z = GY_z^3$$

Where:

$\Delta\theta_z$=the angular error of a zonal ray
$Y_z$=the output height of a zonal ray The best that can be done is to split the difference between the marginal ray and the zero height ray which has no error. Thus:

$$\frac{\Delta\theta_z}{\Delta\theta_m} = \frac{1}{2} = \left(\frac{Y_z}{Y_m}\right)^3$$

Thus:

$$\frac{Y_z}{Y_m} = \sqrt[3]{\frac{1}{2}} = 0.7937$$

Thus correcting the length of the scope for the 0.79 ray will give the best results.

For most of the low power scopes the fifth and higher order aberrations are negligible. Thus it is sufficient to assess the third order aberrations. With reference to FIG. 4 we have the following calculations for the third order angular aberrations. For the input ray we have:

$$\sin\alpha_1 = \frac{Y_1}{r_1} = Q$$

Using the third order approximation for the sin we have:

$$\sin\alpha_1 = \alpha_1 - \frac{\alpha_1^3}{6}$$

And applying Snell's law:

$$n_0 \sin\alpha_1 = n \sin\alpha'_1$$

Gives:

$$\alpha'_1 = -\frac{Q}{n} - \frac{1}{6}\left(\frac{Q}{n}\right)^3$$

$$\alpha'_1 = -\frac{Q}{n} - \frac{1}{6}\left(\frac{Q}{n}\right)^3$$

Now, the angle the ray leaving surface 1 makes with the z axis is:

$$\gamma = \alpha_1 - \alpha'_1 = -AQ - C\left(\frac{Q^3}{6}\right)$$

Where: $A = 1 - (1/n)$
$C = 1 - (1/n)^3$

Now, the height of the ray at surface number 2 will be:

$$Y_2 = Y_1 + Z_t \tan\gamma$$

Where $Z_t$ is the total axial distance traveled by the ray.

Using the sag of the first surface and solving for the intercept at the second surface gives the height at the second surface.

$$Y_2 = (r_1 - Z'A)Q - \left[C + \frac{3r_1 A}{mZ_1} - \frac{6A^2}{m} - \left(2 + \frac{3Z'}{mr_1}\right)A^3\right]\frac{Z'Q^3}{6}$$

Where: $Z' = Z + Z_1$

And $Z_1$=the sag at surface number 1

To determine the angle of incidence at the second surface it is necessary to compute the angle of the normal at the point of incidence, $\delta$.

$$\delta = \left(\frac{Z'A}{r_1} - 1\right)\frac{Q}{m} + \left[\begin{array}{c} C - \frac{r_1}{Z'm^2} + 3A\left(\frac{1}{m} + \frac{r_1}{Z'm}\right) - \\ 3A^2\left(\frac{2}{m} + \frac{Z'}{r_1 m^2}\right) + A^3\left(2 + \frac{3Z'}{r_1 m} + \frac{Z'^2}{r_1^2 m^2}\right) \end{array}\right]\frac{Z'Q^3}{6r_1 m}$$

The angle of incidence is then:

$$\alpha_2 = \delta - \gamma$$

and $$\sin\alpha_2 = \left[\left(\frac{Z'}{r_1} + m\right)A - 1\right]\frac{Q}{m} + \left[C\left(1 + \frac{r_1 m}{Z'}\right) + \frac{3r_1 A^2}{Z'} - A^3\left(1 + \frac{r_1 m}{Z'}\right)\right]\frac{Z'Q^3}{6r_1 m}$$

Applying Snell's law to find the angle of refraction $\alpha'_2$, subtracting this angle from $\delta$ to find the angle relative to the Z axis, and applying the condition for zero paraxial power gives, after considerable algebra:

$$\Delta\theta = \left(1 - \frac{1}{n}\right)\left(1 - \frac{1}{m}\right)\frac{Q^3}{2n} \quad (2\text{-}10)$$

This shows the explicit dependence of the aberration on the cube of the ratio of the input ray height to the input radius of curvature. Also, taking the derivative of $\Delta\theta$ with n and setting it equal to zero quickly shows that the worst index of refraction, with respect to aberrations is 2.0. This counter intuitive situation suggests that one wants either a very low index of refraction (with concomitant increase in telescope length) or very high index of refraction (with concomitant non-linear focusing problems for high power density). Luckily, aberrations are so low in most practical applications that the index of refraction can be chosen for ghost control rather than aberration control.

It is instructive to look at the aberrations for a number of conditions. The effort is broken into upscopes (beam expanders) and downscopes (beam contractors). First, for a fixed ratio of the input ray height to radius of curvature ratio the angular power is varied with index of refraction as a parameter. Typical values have been selected. A ray height of 1.9 mm and a first radius of curvature of 20 mm have been used. The indexes of refraction are for fused silica, undoped YAG, zinc sulfide, zinc selenide, silicon and germanium. These being materials typically available for the task and representing the largest index spread available. An index of 2.0 has been included as the worst case condition.

Figure 5:
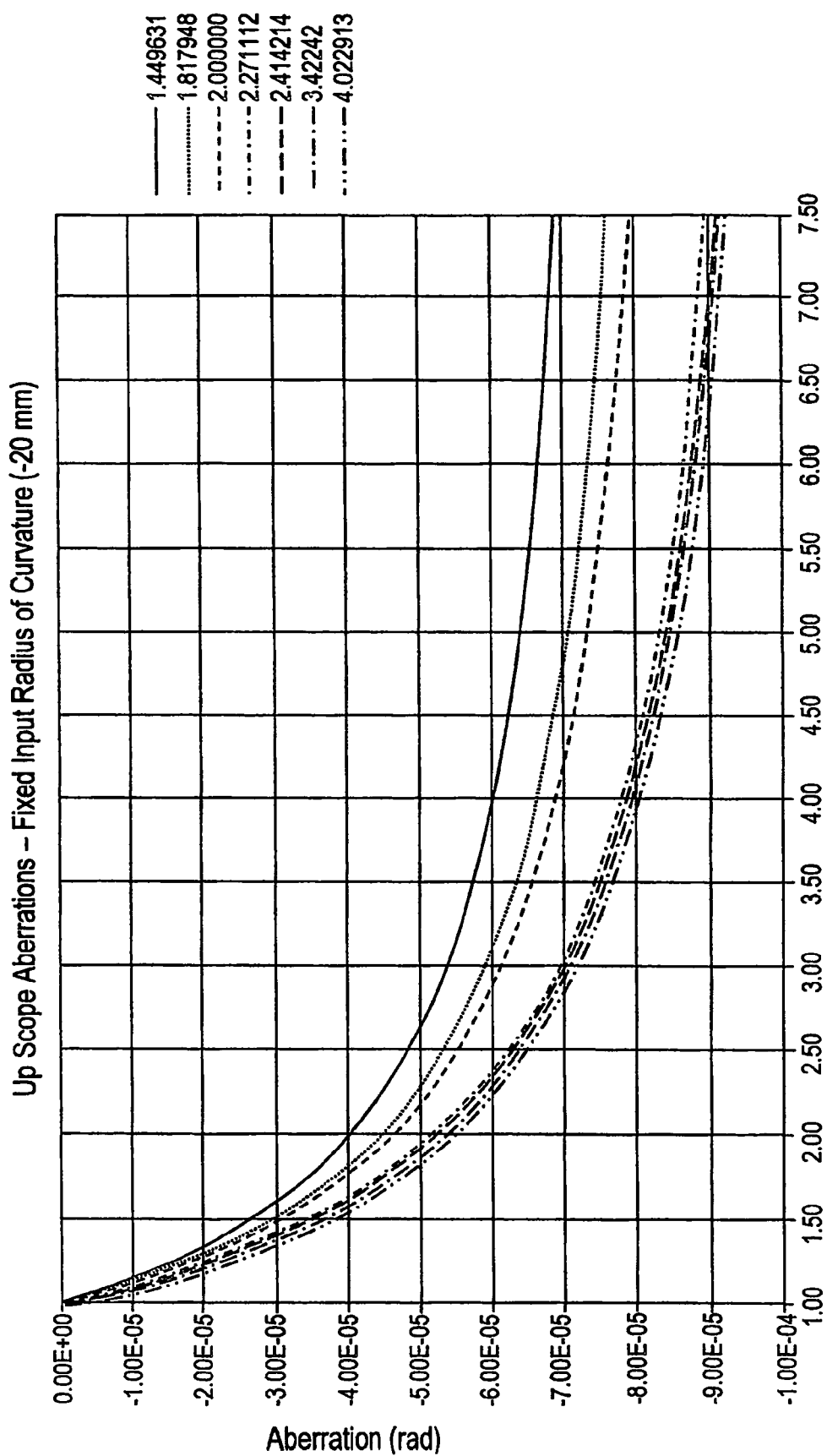
FIG. 5 is a graph of magnification versus aberration for upscope aberrations for a fixed input radius of curvature of −20 millimeters for a variety of magnifications.

FIG. 5 shows the third order aberrations for the upscopes described above It can be seen that for scopes of 2.5 magnification or less, aberrations are less than 70 μrad. Considering that the natural divergence of the laser being collimated rarely goes below 2.5 mrad (10 mm mrad). The collimated beam will have natural divergence of about 1 mrad., thus, the aberrations are well below 10% of the natural divergence and can be neglected.

Figure 6:
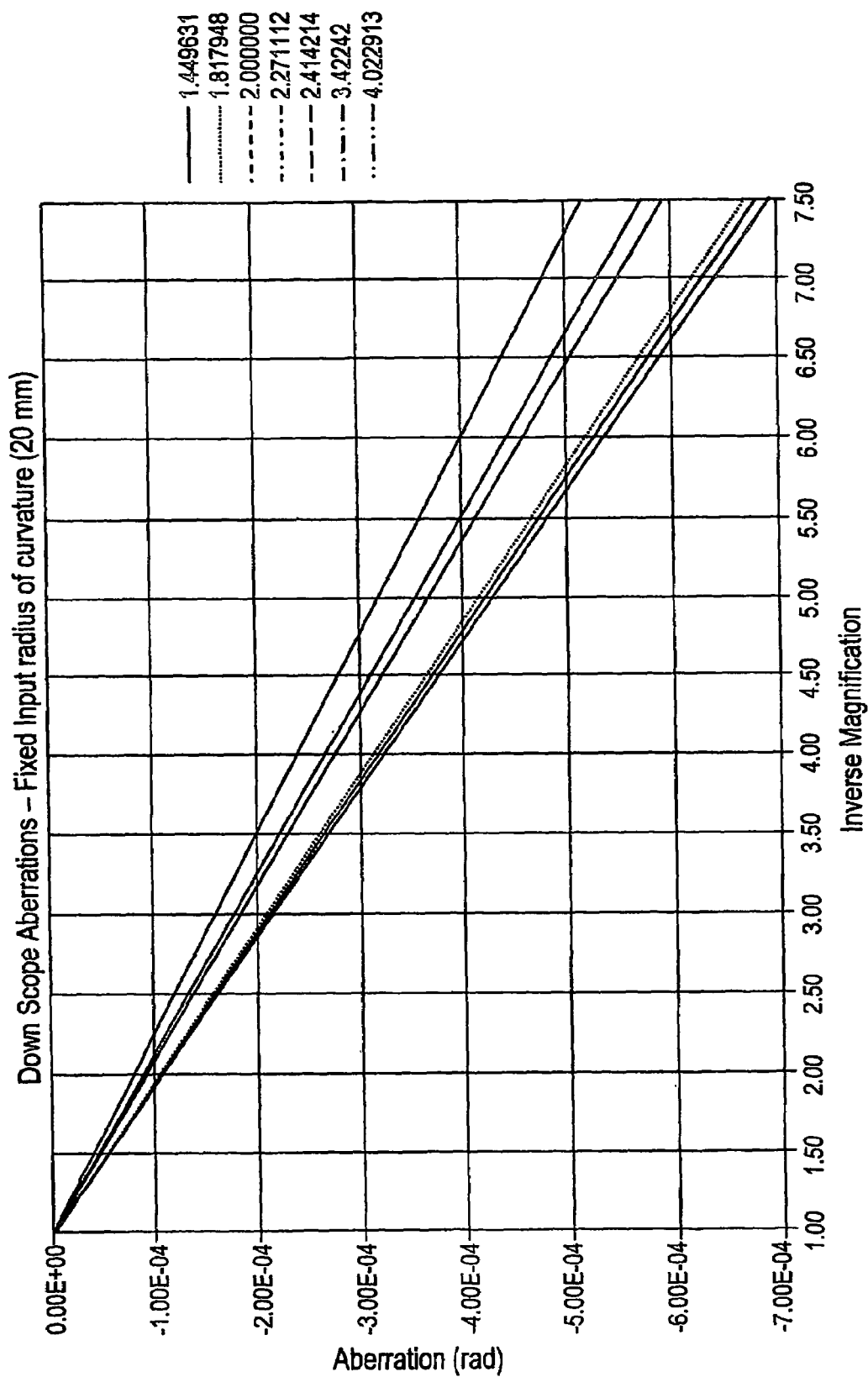
FIG. 6 is a graph of downscope aberrations for a fixed input radius of curvature of 20 millimeters, graphing aberration in radians versus inverse magnification for a variety of magnifications.

FIG. 6 shows the aberrations for downscopes under the same conditions as those for the upscopes above. Note that the ordinate is the inverse of the magnification (as one usually speaks of the 1/m magnification rather than m). Also, since the input radius of curvature is fixed, these are not simply the upscopes reversed (as they are below), but a much smaller set of radii. Thus the aberrations are much more sever, even though, used backwards, the scopes have $m^2$ lower aberrations. This presents no difficulty, since the 2.5 mrad natural divergence becomes 6.25 mrad for a scope with m=2.5. The aberrations in this case are less than 100 grad and are thus way below 10% of the natural divergence. Again the aberrations may be neglected.

In practical applications the space available for the telescope is usually limited. Thus it is instructive to fix the length of the scope and vary the angular power. This requires that the input radius of curvature be sized according to:

$$r_1 = \frac{Z(n-1)}{n(1-m)}.$$

Figure 7:
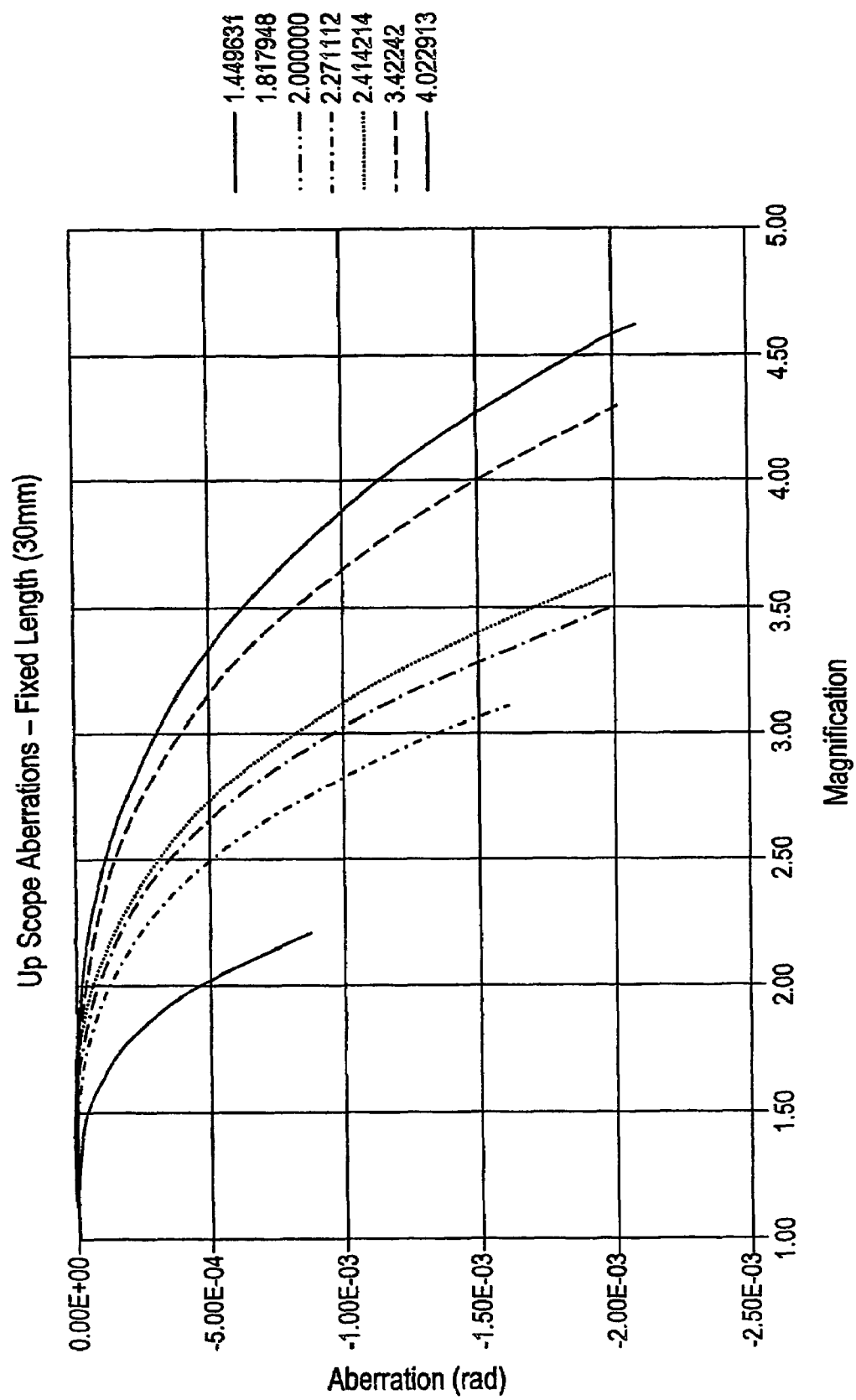
FIG. 7 is a graph showing upscope aberration for a fixed length of −30 millimeters, with aberration being graphed against magnification for a variety of magnifications.

In this case the aberrations grow quite large. FIG. 7 shows the aberrations for various upscopes. The magnification has been stopped where the third order approximation is about 10% smaller than the exact ray trace (in absolute value). Further extension of the angular magnification makes the aberrations worse. Note that the luxury of having a short telescope can be exercised only for low angular power (below about 1.65 for fused silica, to about 2.45 for Germanium)

Figure 8:
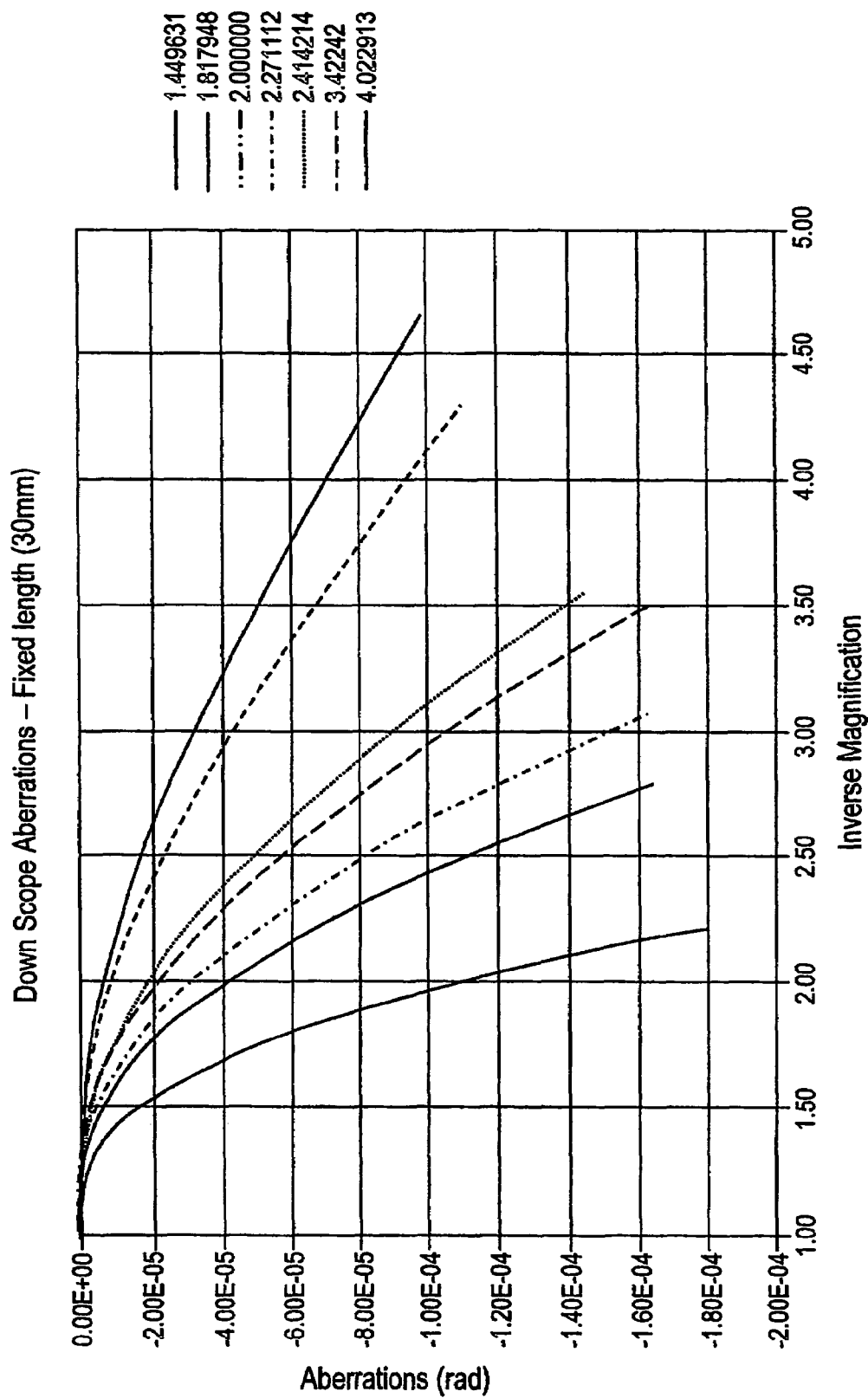
FIG. 8 is a graph of downscope aberrations for a fixed length of 30 millimeters, graphing aberration against inverse magnification for a variety of magnifications.

Downscopes of fixed length are more forgiving. FIG. 8 plots the aberrations of the same scopes shown in FIG. 7, but used in the demagnifying direction (the abscissa is, again, inverse magnification). The aberrations are reduced by m2.

Thus these scopes can be used at any magnification, with any index of refraction without concern for the aberrations. Only the ghosts drive designs in this realm and the length can be kept short if needed.

3.0 Temperature Characteristics of the Telescope

Typically, these devices are used over a wide range of temperatures (−60 to +70° C.). To evaluate the angular error associated with a ray entering at height y, it is necessary to evaluate the power of the lens caused by the change in temperature. Then the angular error will be:

$$\Delta\theta = -ay_m \quad (3\text{-}1)$$

Now the effect on the linear dimensions and the index of refraction can be evaluated by:

$$l(T) = l(T_0)(1 + cte\Delta T) \quad (3\text{-}2)$$

$$n(T) = n(T_0)\left(1 + \frac{\partial n}{\partial T}\Delta T\right)$$

Where:
 n(T)=index of refraction at temperature T
 n(T$_0$)=index of refraction at room temperature
 cte=coefficient of thermal expansion
 ΔT=temperature difference between room temperature and the evaluated temperature
 l=any length variable
 ∂n/∂T=the temperature coefficient of index of refraction.

Taking the derivative of equation (2-5) with respect to temperature and applying equations (3-2) we have:

$$a = \left(n - 1 + \frac{\partial n}{\partial T}\Delta T\right)$$
$$\left(\frac{1 - cte\Delta T}{r_1}\right)\left[1 - \frac{1}{m} + \frac{z_0}{nmr_1}\left(1 - \frac{1}{n}\frac{\partial n}{\partial T}\Delta T\right)\left(n - 1 + \frac{\partial n}{\partial T}\Delta T\right)\right]$$

where $z_0$ is the room temperature axial thickness. Note that the ratio $Z_0/r_1$ has the same value regardless of temperature, since both variables are linear in temperature. Note that the following relationship has been substituted in the above equation.

$$r_2 = mr_1$$

Making use of the relations:

$$\frac{Z_0(n-1)}{nmr_1} = \frac{1-m}{m}$$

gives:

$$a = \left(n - 1 + \frac{\partial n}{\partial T}\Delta T\right)\left(\frac{1 - cte\Delta T}{r_1}\right)\left(\frac{1-m}{nm(n-1)}\right)\left(\frac{\partial n}{\partial T}\Delta T\right) \quad (3\text{-}3)$$

Carrying out the multiplication and neglecting terms in $\Delta T^2$ and higher gives:

$$a(T) = \frac{1-m}{r_1 nm} \frac{\partial n}{\partial T} \Delta T. \qquad (3\text{-}4)$$

Note that the coefficient of thermal expansion plays no roll in the first order errors. The size of these error is so small that the design can proceed without regard to the cte. The angular error is then:

$$\Delta\theta(T) = -a(T)Y_m = Q\frac{m-1}{nm}\frac{\partial n}{\partial T}\Delta T \qquad (3\text{-}5)$$

Note that for $r_1=-30$ mm, $m=1.4$, $Y_m=1.9$ mm, $n=1.4496631$, and $dn/dT=11.0\times10^{-6}$, and $\Delta T=-80K$, the aberrations are only, $\Delta\theta=11$ μrad (low power fused silica telescope). This is, as stated above, already negligible compared with the expected natural divergence of the laser.

Figure 9:
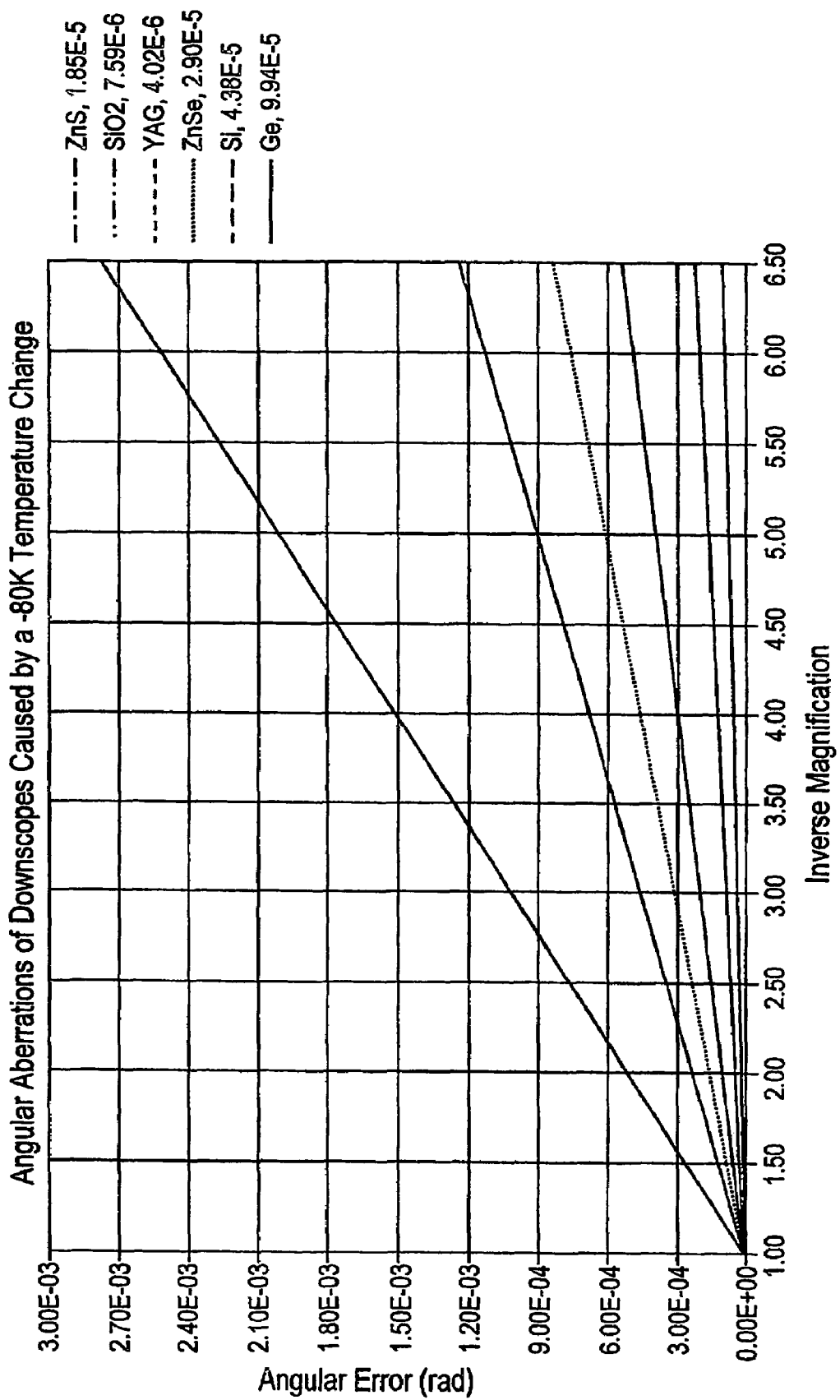
FIG. 9 is a graph showing angular aberrations of downscopes caused by a −80 K temperature change, with angular error first graphed against inverse magnification for a number of lens materials.
Figure 10:
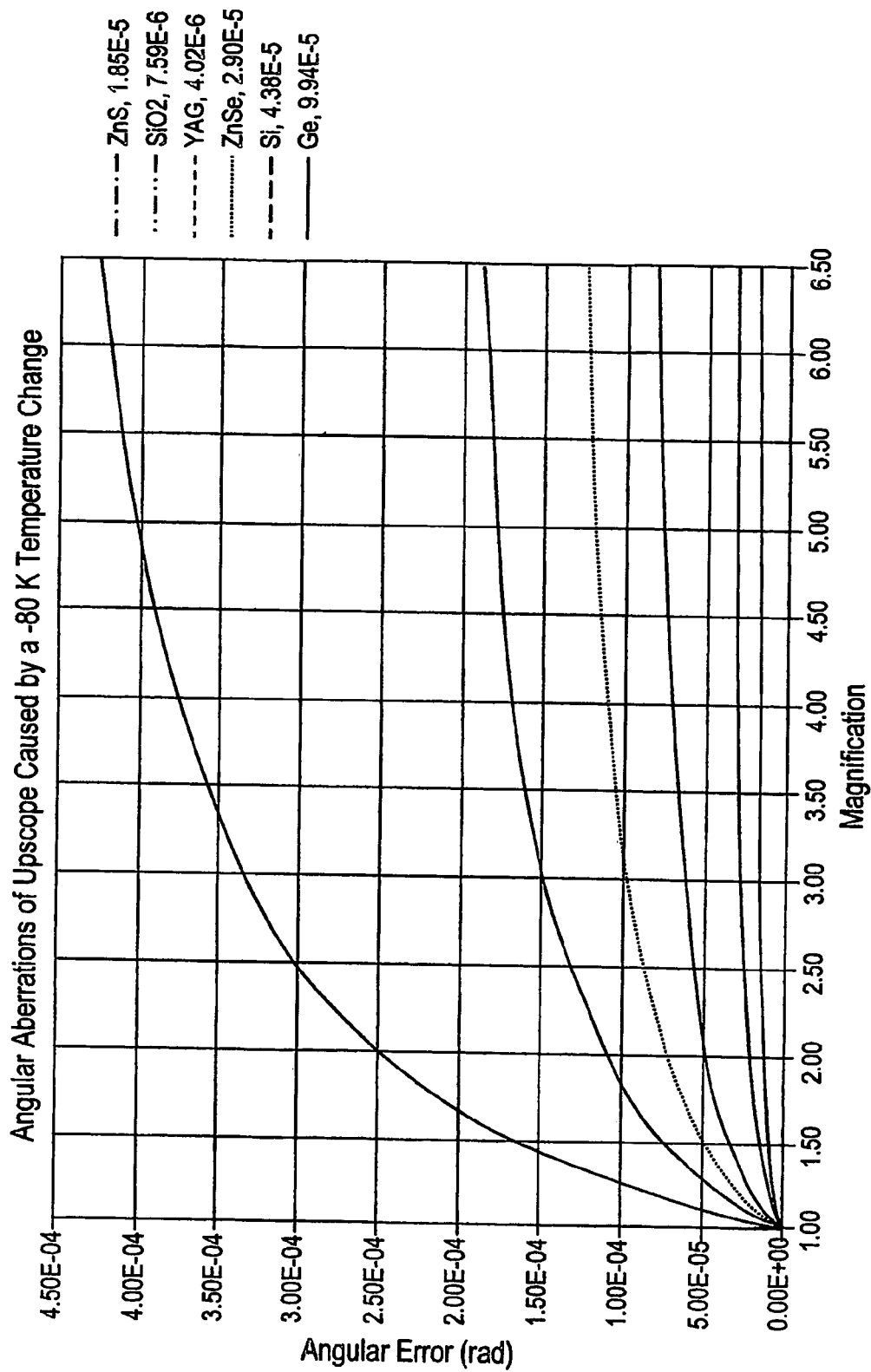
FIG. 10 is a graph showing angular aberrations of upscopes caused by a −80 K temperature change, with angular error graphed against magnification for a number of lens materials.

FIGS. 9 and 10 plot the aberrations of telescopes made from some common optical materials against angular magnification. It can be clearly seen that the only parameter that matters is the dn/dT of the lens material. Materials like fused silica and undoped YAG are very good because this parameter is small. Other materials, which have higher index of refraction (and are thus more desirable for controlling ghosts) are much less suitable in this respect.

4.0 Wavelength Characteristics of the Telescope

It is, at times, desirable to use these telescopes at more than one wavelength. For instance, at 1.064 and 1.57 μm for designators with eye safe rangefinders; or at 4.75 and 3.75 μm for mid IR lasers. Just as in the case of temperature the power added to the telescope is affected by:

$$n(\lambda) = n(\lambda_0) + \frac{\partial n}{\partial \lambda}\Delta\lambda$$

Where: $n(\lambda)$=the index of refraction at wavelength $\lambda$
$n(\lambda_0)$=the index of refraction at the control wavelength
$dn/d\lambda$=the rate of change of index with wavelength (assumed linear for small $\Delta\lambda$)
$\Delta\lambda$=the difference in wavelengths Now the added power due to the change in the index of refraction will be:

$$a = \left(n - 1 + \frac{\partial n}{\partial \lambda}\Delta\lambda\right)\left(\frac{1}{r_1} - \frac{1}{r_2} + \frac{z_0}{nr_1r_2}\left(1 - \frac{1}{n}\frac{\partial n}{\partial \lambda}\Delta\lambda\right)\left(n - 1 + \frac{\partial n}{\partial \lambda}\Delta\lambda\right)\right)$$

Using the same logic as was used for the temperature calculations this leads to:

$$a = \frac{1-m}{r_1 nm}\frac{\partial n}{\partial \lambda}\Delta\lambda$$

and the angular aberrations are:

$$\Delta\theta = Q\frac{m-1}{mn}\frac{\partial n}{\partial \lambda}\Delta\lambda. \qquad (4\text{-}1)$$

Figure 11:
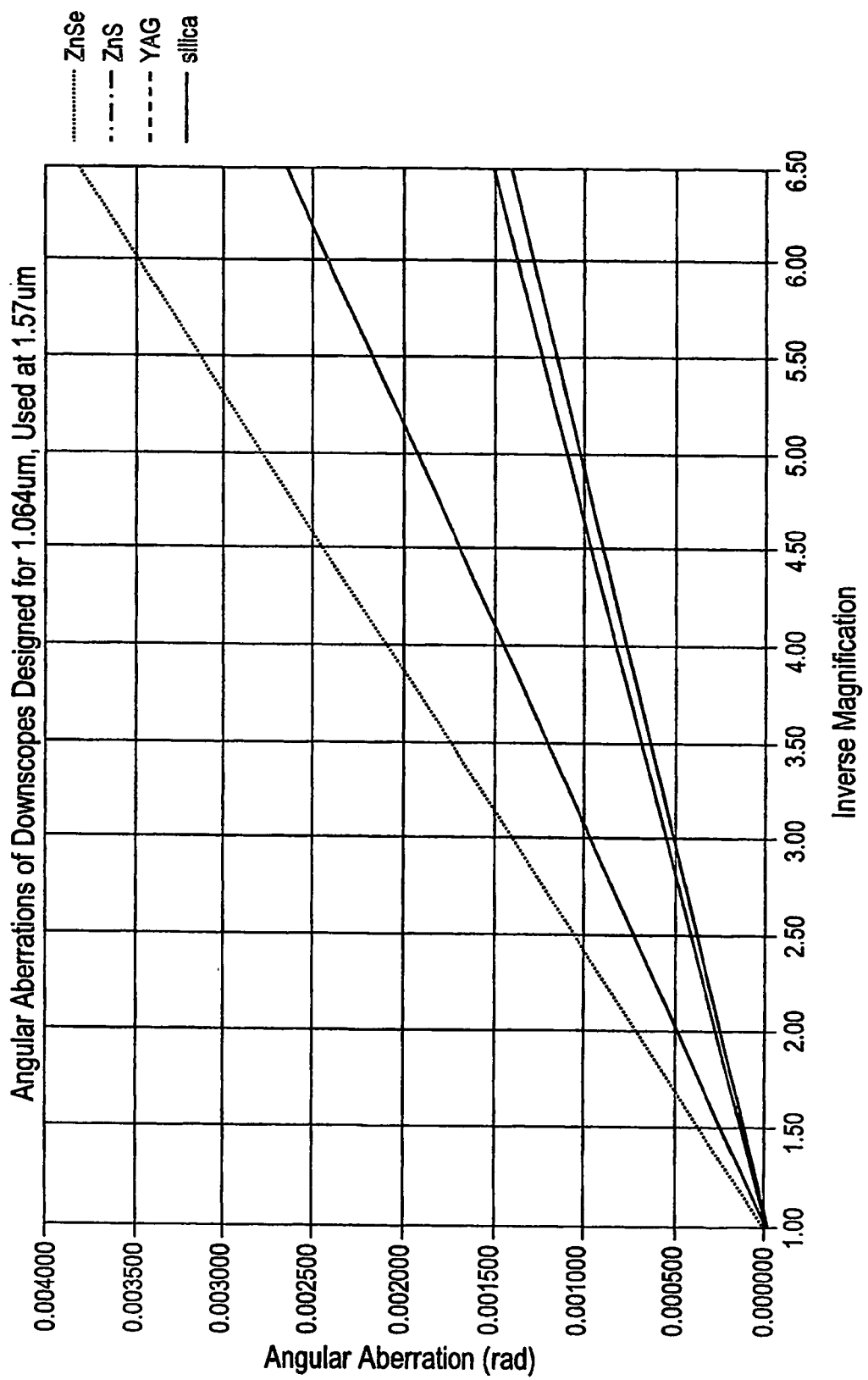
FIG. 11 is a graph showing angular aberrations of downscopes designed for a 1.064 micron laser used at 1.57 microns, graphing angular aberration versus inverse magnification for a number of lens materials.
Figure 12:
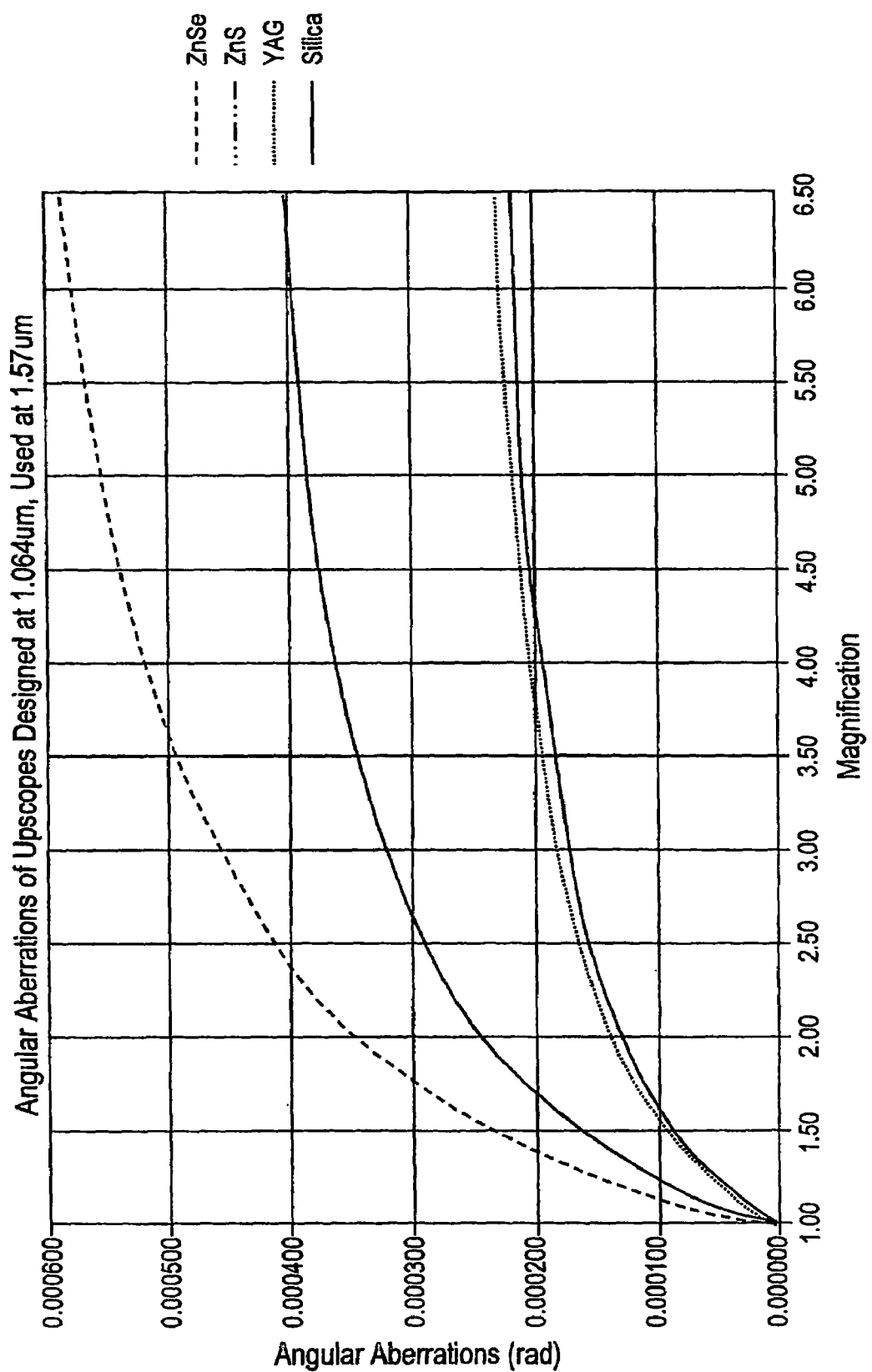
FIG. 12 is a graph of angular aberrations of upscopes designed for a 1.064 micron laser used at 1.57 microns, in which angular aberration is graphed against magnification for a number of lens materials.
Figure 13:
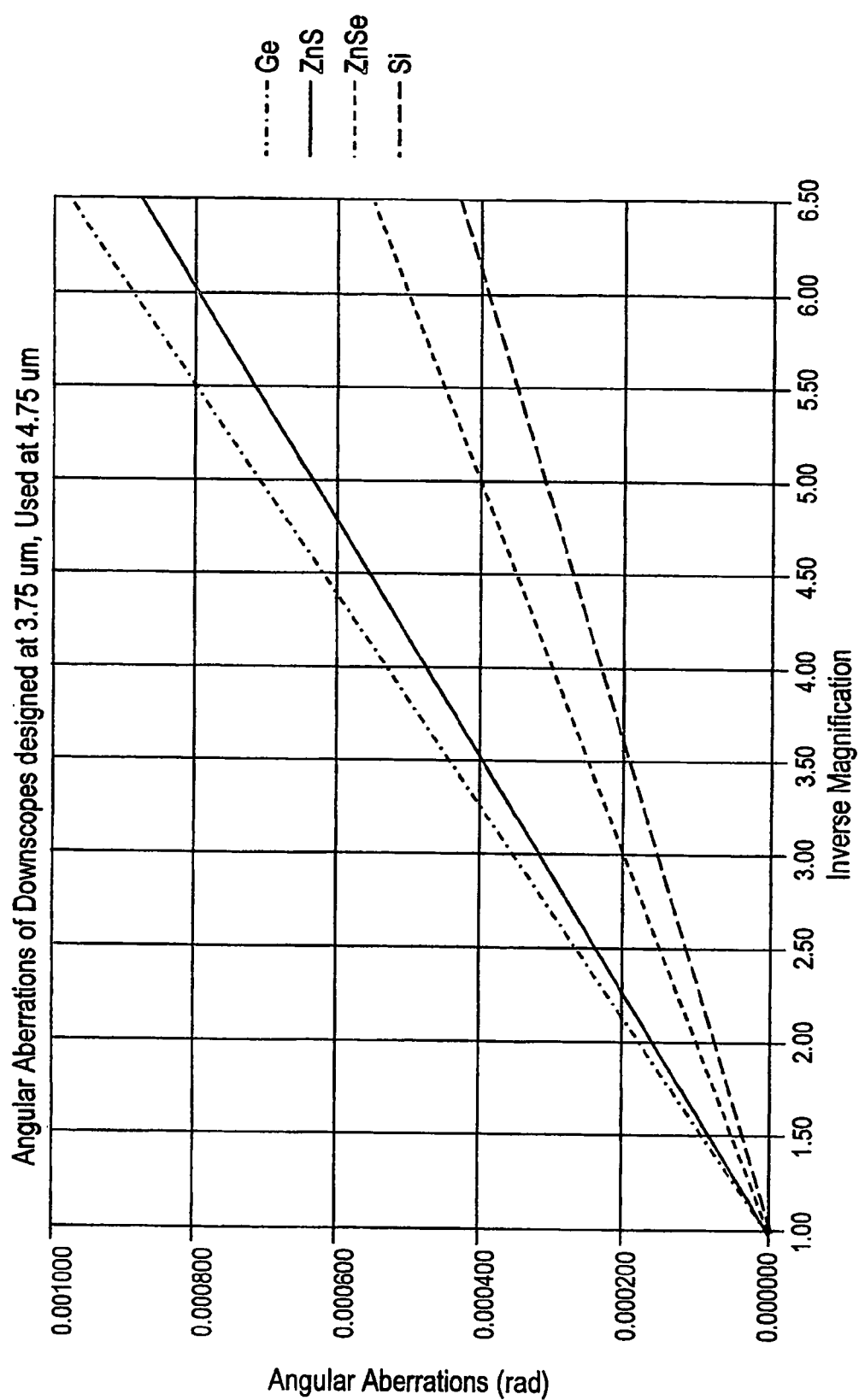
FIG. 13 is a graph of angular aberrations of downscopes for a 3.75 micron laser used at 4.75 microns, in which angular aberrations are graphed against inverse magnification for a number of lens materials; and, FIG. 14 is a graph of angular aberrations of upscopes for a 3.75 micron laser used at 4.75 microns, with angular aberration graphed against magnification for a number of lens materials.
Figure 14:
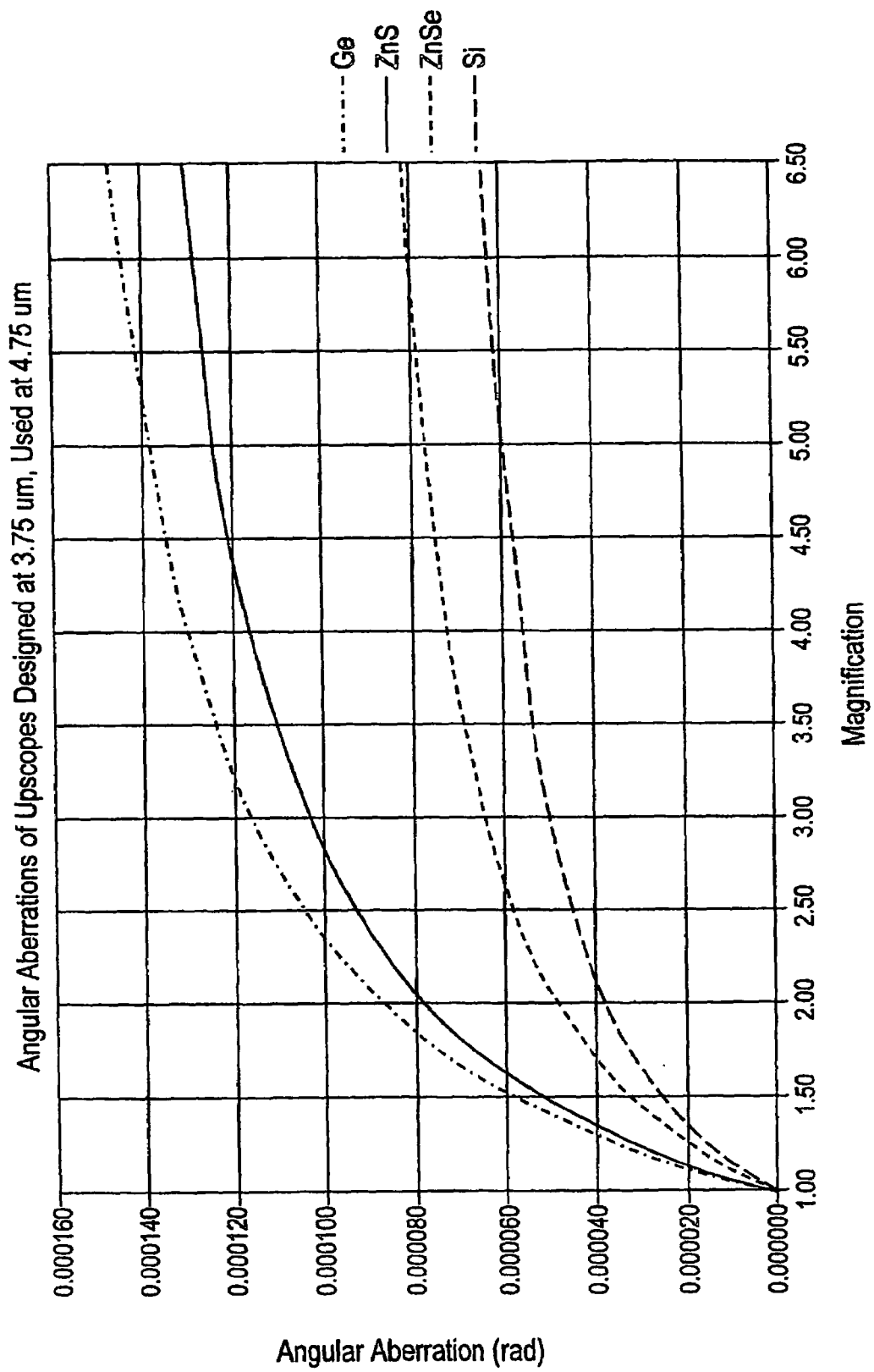

FIGS. 11 and 12 show the aberrations of down and upscopes designed for use at 1.064 μm and used at 1.57 μm. Note, again that the downscopes are perry benign compared to the natural divergence of the laser, but the upscopes quickly add too much aberration unless the most favorable materials (YAG and Silica) are used. Even then very low powers are necessary to keep the aberrations under control. FIGS. 13 and 14 provide the same information for telescopes designed at 3.75 μm and used at 4.75 μm. At these wavelengths the dispersion of the materials used for the telescopes is much smaller and much more latitude is available in the selection powers and materials.

Note that some compensation can be had by making the aberrations caused by color compensate for the third order aberrations. This can be done for some zonal ray by setting equation 2-10 equal to equation 4-1. The result is a condition on the ratio of the input ray zonal height to the input radius of curvature:

$$Q = \left(\frac{-2n}{n-1}\frac{\partial n}{\partial \lambda}\Delta\lambda\right)^{\frac{1}{2}} \qquad (4\text{-}2)$$

The compensation is independent of the magnification. However, for a large change in the index of refraction either one must confine the zonal ray height to very small numbers (of the order of 0.5 mm or less for the 1.064 μm to 1.57 μm spread), or the choice of radius of curvature becomes very small. This makes the third order aberrations large and the scheme becomes impractical. For smaller wavelength differences or materials with lower dispersion (such as encountered in the infrared) the aberrations can be balanced. Thus the first color will exhibit the typical cubic curve of aberration with ray height while the longer wavelength color will exhibit a curve which has zero aberration at the zonal point and the axial point and curves out and back to connect these two points.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A singlet telescope for reshaping the output of a laser, comprising:
   a monolithic lens element having two spaced-apart surfaces said surfaces radiused in the same direction, wherein said radiused surfaces have the same length radius of curvature, and the singlet telescope is described by:

$$R_1 = \frac{Z(n-1)}{n(1-m)}$$

where $R_1$ is the radius of curvature of the input surface, Z refers to the length of the element, n is the index of refraction of the lens medium and m is the angular magnification.

2. The telescope of claim 1, wherein said telescope is used to magnify the output of said laser, thus to present concave surfaces to the laser that generate focused retro-reflections and wherein the retro-reflections are focused close to said monolithic element away from said laser.

3. The telescope of claim 1, wherein under a predetermined magnification the third-order aberrations associated with said singlet telescope are insignificant, and said predetermined magnification is 2×.

4. The telescope of claim 1, Wherein the material for said monolithic element is selected from the group consisting of ZnSe, ZnS, YAG, Ge and Si.

5. A method for minimizing retro-reflective ghosts from a telescope used to reshape the output of a laser, comprising the step of:
 using a singlet telescope to reshape the output of the laser.

6. The method of claim 5, wherein the singlet telescope has only two reflective surfaces.

7. A method for controlling the diameter and position of a waist of a collimated light beam produced by a pump laser in a nonlinear crystal used by an optical parametric oscillator, comprising the step of:
 interposing a singlet telescope between the pump laser and an end of the nonlinear crystal, wherein the singlet telescope includes a monolithic element having two spaced-apart surfaces, the surfaces radiused in the same direction, the radiused surfaces have the same length radius of curvature, and the singlet telescope is described by:

$$R_1 = \frac{Z(n-1)}{n(1-m)}$$

where $R_1$ is the radius of curvature of the input surface, Z refers to the length of the element, n is the index of refraction of the lens medium and m is the annular magnification.

* * * * *